United States Patent [19]
Savolainen et al.

[11] Patent Number: 5,611,928
[45] Date of Patent: Mar. 18, 1997

[54] PROCESS FOR TREATING WASTE WATER

[75] Inventors: Martti Savolainen; Tarmo Syväpuro, both of Espoo; Eija Laine, Oulu, all of Finland

[73] Assignees: Kemira Oy; Oy Keskuslaboratorio-Central Laboratorium AB, both of Espoo, Finland

[21] Appl. No.: 454,316
[22] PCT Filed: Dec. 3, 1993
[86] PCT No.: PCT/FI93/00524
  § 371 Date: Jul. 14, 1995
  § 102(e) Date: Jul. 14, 1995
[87] PCT Pub. No.: WO94/13591
  PCT Pub. Date: Jun. 23, 1994

[30] Foreign Application Priority Data

Dec. 4, 1992 [FI] Finland .................... 925506

[51] Int. Cl.⁶ .................. C02F 1/72; C02F 1/12
[52] U.S. Cl. ............. 210/631; 210/759; 210/763; 210/928
[58] Field of Search ............... 210/759, 631, 210/763, 928

[56] References Cited

FOREIGN PATENT DOCUMENTS

| | | |
|---|---|---|
| 0419842 | 4/1991 | European Pat. Off. . |
| 925506 | 12/1993 | Finland . |
| 2118486 | 10/1971 | Germany . |
| 2521893 | 11/1975 | Germany .............. 210/759 |
| 3840323 | 5/1990 | Germany . |
| 2944 | 1/1978 | Japan .................. 210/759 |
| 78-120231 | 9/1978 | Japan . |
| 155693 | 12/1981 | Japan .................. 210/759 |
| 24692 | 2/1982 | Japan .................. 210/759 |
| 24693 | 2/1982 | Japan .................. 210/759 |
| 60-261590 | 12/1985 | Japan . |
| 613917 | 10/1979 | Switzerland . |

OTHER PUBLICATIONS

Search Report for Finnish Appl. No. 925506, filed Dec. 7 1995 dated Jul. 10, 1995.

Kankyo Eng. KK., "Pretreating organic effluent—to remove organic and colouring materials", JP 55047199, A, 880403, 8020 (Basic).

*Primary Examiner*—Neil McCarthy
*Attorney, Agent, or Firm*—Loeb & Loeb LLP

[57] ABSTRACT

The invention relates to a process for the treatment of waste waters of the forest industry. According to the invention, waste water is pre-treated biologically, whereafter the further treatment is carried out by using Fe(II) salt and hydrogen peroxide.

8 Claims, No Drawings

PROCESS FOR TREATING WASTE WATER

BACKGROUND OF THE INVENTION

The invention relates to a process for treating waste water produced in the forest industry, in which process the waste water is further treated with chemicals after a biological treatment.

The waste waters of the forest industry contain varying amounts of dissolved and solid organic and inorganic substances derived from the raw materials used. The waste waters thus pollute the watercourses into which they are discharged. Solid insoluble substances make the water turbid and form a layer of sludge on the floor of the watercourse. Organic substances, regardless of whether they are dissolved or solid, consume oxygen from the water and directly or indirectly give it a taste or odor.

In spite of the fact that in the past 10–20 years the production of pulp has multiplied in Finland, the waste water load caused by the forest industry has been substantially reduced. The solution to the problem of waste water has, especially in Finland, been the activated sludge process, in which the organic substance is decomposed by microorganisms. By the activated sludge process, as well as by other biological processes, it is possible to remove from waste water primarily small-molecular organic matter which causes biological oxygen demand (BOD).

The licence conditions set by the authorities presuppose, for reasons of environmental protection, also the removal of solids from waste waters. Solids have indeed been removed by using combinations of biological and chemical processes.

When the activated sludge process is used, the reduction of matter causing chemical oxygen demand (COD), as well as of nutrients such as phosphorus and nitrogen, remains considerably lower than the reduction of matter causing biological oxygen demand. Nutrients are derived not only from waste waters themselves but also from the chemicals possibly added at the biological treatment stage.

It is known to remove large-molecular organic matter (COD) and phosphorus from waste waters by means of chemical precipitation, for example by using aluminum or iron coagulants.

DE application publication 2 521 893 (SCA Development AB) proposes the removal of color and the matter which causes chemical oxygen demand (COD), present in the waste waters from pulp production, especially in waste liquors, by means of hydrogen peroxide and a ferrous salt. However, a satisfactory removal of the matter causing biological oxygen demand is generally not achieved by the use this method.

A process based on oxidation for the treatment of waste waters is also otherwise known. The oxidation of waste water is carried out by using hydrogen peroxide, the oxidative action of which can be enhanced by means of a catalyst, for example, a metal ion, UV light, or ozone.

The latest licence conditions for the waste waters of the forest industry set high requirements on emissions; not only the removal of matter causing chemical oxygen demand (COD) and of phosphorus but also the removal of organic chlorine compounds (AOX) is required. Organic chlorine compounds are formed in connection with bleaching with chlorine chemicals. Since nitrogen, in the form of both organic and inorganic, dissolved, insoluble and colloidal compounds, is also present in the waste waters, the reduction of nitrogen emissions has been set as an objective in licence conditions.

SUMMARY OF THE INVENTION

The present invention relates to a process for the treatment of the waste waters of the forest industry, enabling the stricter licence conditions to be fulfilled. The process provides an efficient method of eliminating the environmental load of both matter causing biological oxygen demand and matter causing chemical oxygen demand, as well as phosphorus, nitrogen and organic halogen compounds.

By the process according to the invention, strict licence conditions can be fulfilled in a simple manner by combining a biological treatment process and a process in which chemicals can be used which in themselves will not cause further environmental problems.

The characteristics of the process according to the invention are given in the accompanying patent claims.

DETAILED DESCRIPTION OF THE PREFERRED EMBODIMENTS

In the process according to the present invention, waste waters from the forest industry are first treated biologically. The waste waters of pulp and paper mills are directed to a biological treatment plant, for example to an activated sludge plant or an aerated pond, in which a large proportion of the small-molecular organic matter can be removed. The biologically treated waste water is then precipitated by means of a ferrous salt ($Fe^{2+}$) and hydrogen peroxide, by adding the chemicals simultaneously or almost simultaneously to the waste water.

The ferrous salt and the hydrogen peroxide are added either simultaneously or by adding the ferrous salt first and the hydrogen peroxide immediately thereafter. Before the adding of the hydrogen peroxide, the pH must be adjusted by means of a mineral acid, for example sulfuric acid. It is also advisable to adjust the pH before the adding of the ferrous salt. The pH range of the system may be 3.5–6. The optimum pH is within the range 3.7–4.2.

The ferrous salt is preferably ferrous sulfate. The amount of ferrous sulfate to be added depends on the type of the waste water. The hydrogen peroxide used may have a concentration of 30–50%.

The weight ratio of the ferrous salt to the hydrogen peroxide may vary within 1:0.01–1:0.3, preferably 1:0.1–1:0.2.

The precipitate which contains impurities may be separated either by settling or by flotation with or without a polyelectrolyte.

By the process according to the invention, in particular the amounts of nitrogen, organic halogen compounds, phosphorus and chlorophenols can be reduced significantly as compared with the processes currently used.

The invention is described in greater detail in the following non-limiting examples and with the help of test results obtained. In these examples $COD_{Cr}$ stands for chemical oxygen demand measured by the dichromate method, $BOD_7$ stands for biological oxygen demand within seven days, and AOX stands for organic chlorine compounds.

EXAMPLE 1

Table 1 shows results of the precipitation of biologically treated waste water of a pulp mill with ferrous sulfate and hydrogen peroxide.

TABLE 1

Precipitation, with ferrous sulfate and hydrogen peroxide, of waste water taken from the overflow of the activated sludge plant of a pulp mill. Fe was added in the experiment at a rate of 160 mg/l waste water.

| | Before precipitation mg/l | After precipitation mg/l | Reduction % |
|---|---|---|---|
| $BOD_7$ | 13 | 3.3 | 75 |
| $COD_{Cr}$ | 730 | 100 | 86 |
| AOX | 20.1 | 2.5 | 88 |
| N | 2.87 | 0.44 | 85 |
| P | 1.04 | 0.04 | 96 |
| Color number | 2180 | 40 | 98 |

As can be observed from Table 1, a very good reduction of all of the parameters causing an environmental load is achieved by the process.

EXAMPLE 2

TABLE 2

Reduction (%) of COD, AOX, nitrogen (N), and phosphorus (P) in the total waste water of a pulp plant in precipitation with ferrous sulfate and hydrogen, before and after the activated sludge plant (ASP).

| Waste water | Ferrous kg/kg $COD_{Cr}$ | $COD_{Cr}$ reduction % | AOX reduction % | N reduction % | P reduction % |
|---|---|---|---|---|---|
| Birch before ASP | 2.5 | 64 | 66 | 95 | 96 |
| Birch before ASP | 1.7 | 61 | 64 | 92 | 92 |
| Birch after ASP | 1.5 | 85 | 84 | 85 | 97 |
| Birch after ASP | 1.1 | 72 | 70 | 69 | 96 |

As can be seen from Table 2, the consumption of, for example, ferrous sulfate is substantially higher and the purification result poorer with waste water which has not been treated biologically than with waste water which has been treated biologically.

It is especially advantageous to carry out the ferrous sulfatehydrogen peroxide precipitation on waste water from which small-molecular compounds which decompose easily have been removed, since these compounds otherwise increase the consumption of the precipitation chemicals and, nevertheless, are not precipitated. This is evident from Table 2, showing the results of precipitation of waste water before and after the activated sludge plant.

EXAMPLE 3

When ferrous sulfate and hydrogen peroxide were added to waste water which has been treated in the sludge pond of a cardboard mill and does not contain dissolved oxygen (anaerobic state), precipitation does not occur. However, precipitation can be achieved by aeration, i.e. by dissolving oxygen from air into the waste water before the adding of ferrous sulfate and hydrogen peroxide. Table 3 shows the results of precipitation experiments conducted in a laboratory.

TABLE 3

| | $Fe^{2+}$ mg/l | $H_2O_2$ mg/l | $COD_{Cr}$ mg/l | N mg/l | P mg/l | Reduction % COD | N | P |
|---|---|---|---|---|---|---|---|---|
| Original waste water | — | — | 750 | 3.81 | 0.49 | — | — | — |
| Anaerobic | 105 | 45 | no precipitation occurs | | | | | |
| Anaerobic | 105 | 60 | no precipitation occurs | | | | | |
| Aerated | 105 | 45 | 290 | 1.46 | 0.02 | 61 | 62 | 96 |

As can be seen from Table 3, when the waste water is anaerobic, no precipitation occurs even with a larger dose of hydrogen peroxide. In the oxidation reaction of ferrous iron and organic matter, soluble oxygen also serves as an oxidant.

EXAMPLE 4

Unclarified pulp and paper mill waste water which had been treated biologically and been aerated in the pond (Table 4) was precipitated in the laboratory by adding ferrous sulfate and hydrogen peroxide to the waste water. Reference precipitation was carried out by using a metal salt (ferric sulfate). The pH of the waste water after all the additions of chemicals was 3.8. The weight ratio of ferrous sulfate to hydrogen peroxide was 1:0.05. The formed precipitate was separated by settling, and the clarified water was analyzed for turbidity, $COD_{Cr}$, $BOD_7$, P, N, AOX, and CP (chlorophenol).

TABLE 4

Results for unclarified waste water

| Property | Initial level | Reduction % FS + $H_2O_2$ | Metal salt |
|---|---|---|---|
| Turbidity | 116 NTU | 97 | 75 |
| $COD_{CR}$ | 550 mg/l | 78 | 68 |
| $BOD_7$ | 30 mg/l | 83 | >83 |
| $P_{tot}$ | 1.3 mg/l | 97 | 84 |
| $N_{tot}$ | 9 mg/l | 89 | 67 |
| AOX | 3.03 mg/l | 67 | 36 |
| CP | 0.112 mg/l | 23 | 0 |

EXAMPLE 5

Biologically treated pulp and paper mill waste water which had been aerated in the pond and clarified (Table 5) was precipitated in the laboratory by adding ferrous sulfate and hydrogen peroxide to the waste water. Reference precipitation was carried out by using a metal salt (ferric sulfate). The pH of the waste water after the addition of all the chemicals was 3.8. The weight ratio of ferrous sulfate to hydrogen peroxide was 1:0.05. The formed precipitate was separated by settling, and the clarified water was analyzed for turbidity, $COD_{Cr}$, P, N, and AOX.

TABLE 5

Results for clarified waste water

| Property | Initial level | Reduction % FS + $H_2O_2$ | Metal salt |
|---|---|---|---|
| Turbidity | 126 NTU | 98 | 97 |
| $COD_{CR}$ | 505 mg/l | 92 | 89 |
| $P_{tot}$ | 1.6 mg/l | 94 | 88 |
| $N_{tot}$ | 8 mg/l | 88 | 50 |

TABLE 5-continued

Results for clarified waste water

| Property | Initial level | Reduction % | |
|---|---|---|---|
| | | FS + H$_2$O$_2$ | Metal salt |
| AOX | 2.8 mg/l | 83 | 65 |

EXAMPLE 6

Waste water flowing into and waste water flowing out of the activated sludge plant of a sulfate pulp mill were treated with ferrous sulfate and hydrogen peroxide. The ratios of the ferrous sulfate amounts to the hydrogen peroxide amounts were a) 1:0.10 and b) 1:0.20. The results in Table 6 show that the process is more effective in removing organic matter from biologically treated than from untreated waste water.

TABLE 6

Results before and after the activated sludge plant

| Waste water | Ferrous sulfate mg/mg COD$_{Cr}$ | Reduction % | | | |
|---|---|---|---|---|---|
| | | COD$_{Cr}$ | | Turbidity | |
| | | a | b | a | b |
| Before ASP | 0.77 | 3 | 59 | 0 | 96 |
| | 0.5 | 62 | 69 | 96 | 93 |
| | 2.3 | 64 | 74 | 92 | 92 |
| After ASP | 0.86 | 79 | 81 | 90 | 85 |
| | 1.7 | 88 | — | 96 | — |
| | 2.6 | 91 | — | 79 | — |

We claim:

1. A process for treating waste water of at least one of a pulp mill and a paper mill, comprising:

biologically treating the waste water by an activated sludge process; and chemically treating the biologically treated waste water by adding an Fe(II) salt to the biologically treated waste water and by adding hydrogen peroxide to the biologically treated waste water.

2. The process according to claim 1, wherein the Fe(II) salt is ferrous sulfate.

3. The process according to claim 1 or 2, wherein the weight ratio of the Fe(II) salt to hydrogen peroxide ranges from 1:0.01 to 1:0.3.

4. The process according to claim 3, wherein the weight ratio of Fe(II) salt to hydrogen peroxide is 1:0.1–1:0.2.

5. The process according to claim 1, wherein the biologically treated waste water is adjusted to a pH in the range of 3.5–6 before the adding of the Fe(II) salt and hydrogen peroxide.

6. The process according to claim 5, wherein the biologically treated waste water is adjusted to a pH of 3.7–4.2.

7. The process according to claim 1, wherein the Fe (II) salt and the hydrogen peroxide are added simultaneously.

8. The process according to claim 1, wherein the Fe (II) salt and the hydrogen peroxide are added substantially simultaneously.

* * * * *